(12) United States Patent
Fonseca, Jr.

(10) Patent No.: US 7,785,050 B2
(45) Date of Patent: Aug. 31, 2010

(54) APPARATUS AND METHOD FOR SECURING A VEHICLE ON A CARRIER BED

(76) Inventor: Augustine Fonseca, Jr., 2820 Howard Dr., Redding, CA (US) 96001

( * ) Notice: Subject to any disclaimer, the term of this patent is extended or adjusted under 35 U.S.C. 154(b) by 454 days.

(21) Appl. No.: 12/002,987

(22) Filed: Dec. 18, 2007

(65) Prior Publication Data
US 2009/0155034 A1 Jun. 18, 2009

(51) Int. Cl.
*B60P 3/073* (2006.01)
(52) U.S. Cl. .......................................................... 410/7
(58) Field of Classification Search .................... 410/3, 410/4, 6, 7, 9, 10, 11, 19, 22, 23; 296/61; 414/462, 537, 480
See application file for complete search history.

(56) References Cited

U.S. PATENT DOCUMENTS

| | | | | |
|---|---|---|---|---|
| 1,443,913 A * | 1/1923 | Ellis | .......................... | 254/89 R |
| 2,137,979 A * | 11/1938 | Cooper | .......................... | 410/14 |
| 3,025,985 A * | 3/1962 | Wallace | ...................... | 414/537 |
| 3,625,545 A * | 12/1971 | Somers et al. | .............. | 280/170 |
| 3,822,798 A * | 7/1974 | Neff | .............................. | 414/537 |
| 4,032,167 A * | 6/1977 | Chereda | ......................... | 410/3 |
| 4,488,735 A * | 12/1984 | Hehr | ............................ | 280/656 |
| 4,805,954 A * | 2/1989 | Lazaroff | .................. | 296/65.04 |
| 5,090,718 A * | 2/1992 | Kauffman | .................... | 280/402 |
| 5,553,882 A | 9/1996 | Unruh | | |
| 5,749,685 A | 5/1998 | Hain | | |
| 5,816,757 A | 10/1998 | Huston | | |
| 6,036,417 A * | 3/2000 | Weaver | ............................ | 410/7 |
| 6,050,737 A | 4/2000 | Russell | | |
| 6,139,235 A * | 10/2000 | Vander Koy et al. | ........ | 410/111 |
| 6,296,290 B1 * | 10/2001 | Wolf | ............................. | 296/61 |
| 6,450,472 B1 * | 9/2002 | Cook, Jr. | ..................... | 248/551 |
| 6,536,822 B1 * | 3/2003 | Vagedes et al. | ............ | 296/26.1 |
| 7,147,415 B2 * | 12/2006 | Rorie et al. | ..................... | 410/7 |
| 7,246,731 B1 * | 7/2007 | Matherne, Sr. | .............. | 224/403 |
| 7,287,942 B1 * | 10/2007 | Valkenburgh | ................... | 410/3 |
| 7,549,690 B2 * | 6/2009 | Bourgraf et al. | .............. | 296/20 |
| 7,578,524 B1 * | 8/2009 | Matthews | ................. | 280/763.1 |
| 7,588,401 B2 * | 9/2009 | Latham | .......................... | 410/7 |
| 2005/0220557 A1 * | 10/2005 | Rorie et al. | ..................... | 410/7 |
| 2005/0238455 A1 * | 10/2005 | Toteff | .......................... | 410/104 |
| 2006/0104738 A1 * | 5/2006 | Nolasco et al. | ................. | 410/2 |
| 2008/0247836 A1 * | 10/2008 | Erb et al. | ........................ | 410/7 |

FOREIGN PATENT DOCUMENTS

JP 61188239 A * 8/1986

* cited by examiner

*Primary Examiner*—H Gutman
(74) *Attorney, Agent, or Firm*—R. Michael West

(57) ABSTRACT

An apparatus and method for loading, securing, and unloading a vehicle, from a carrier bed. An aft axle restraint and ramp assembly is lowered to the ground, providing an inclined ramp for the vehicle to be driven onto the bed. The ramp is then raised into a vertical position and locked. The axle restraint, pivotally attached to the ramp, is raised and dropped over the rear axle of the vehicle. A fore vehicle hold down assembly comprises a pair of hooks pivotally connected to a lever arm. The hold down assembly is raised into a disengaged position, and the hooks are placed either over an accessory rack or the front bumper of the vehicle. Lowering the lever arm into an engaged position, pulls the frame forwardly and downwardly, securing the vehicle against fore and aft movement, and maintaining the forward components of the vehicle suspension in a compressed state.

20 Claims, 6 Drawing Sheets

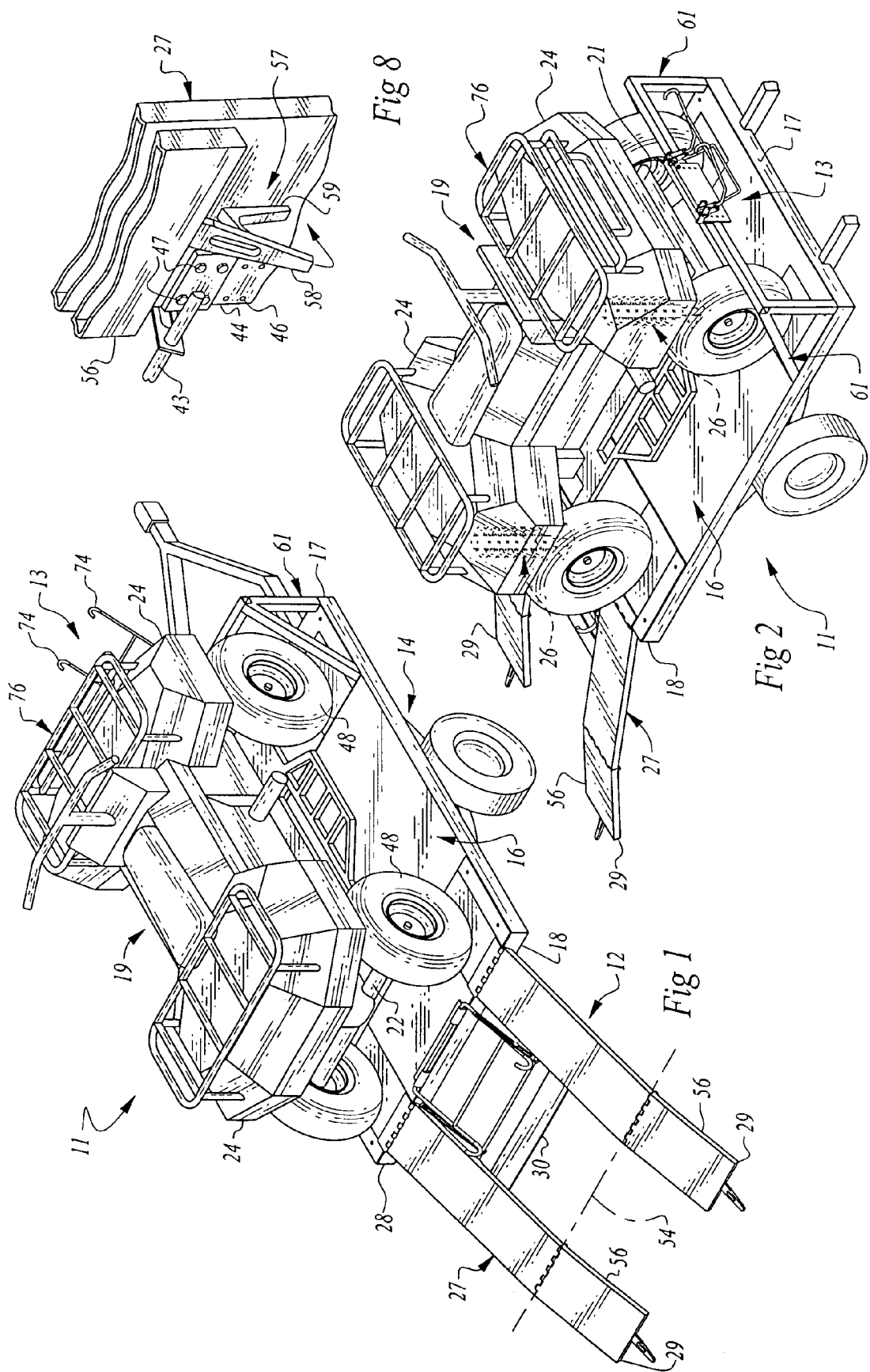

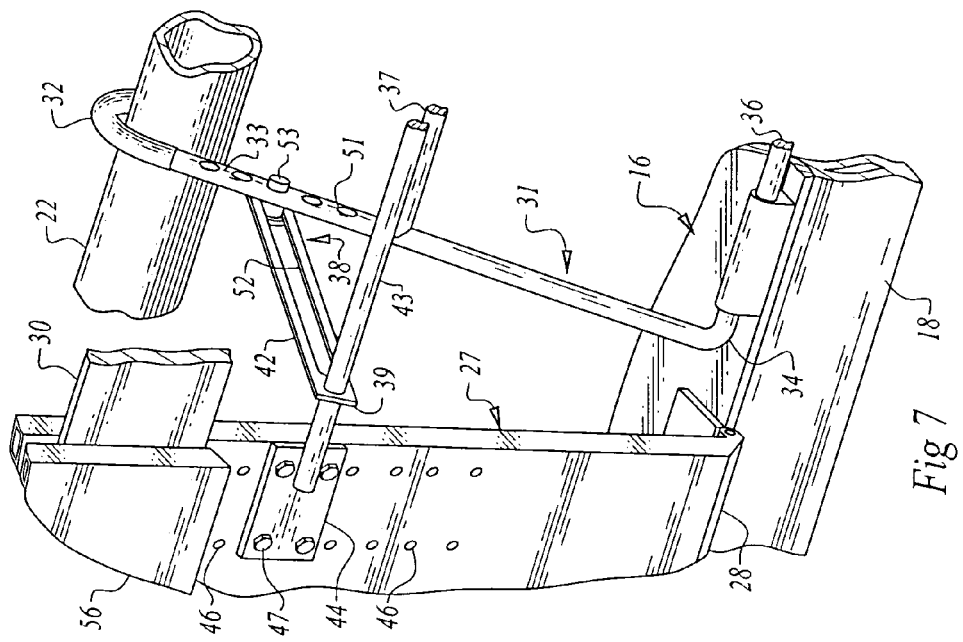
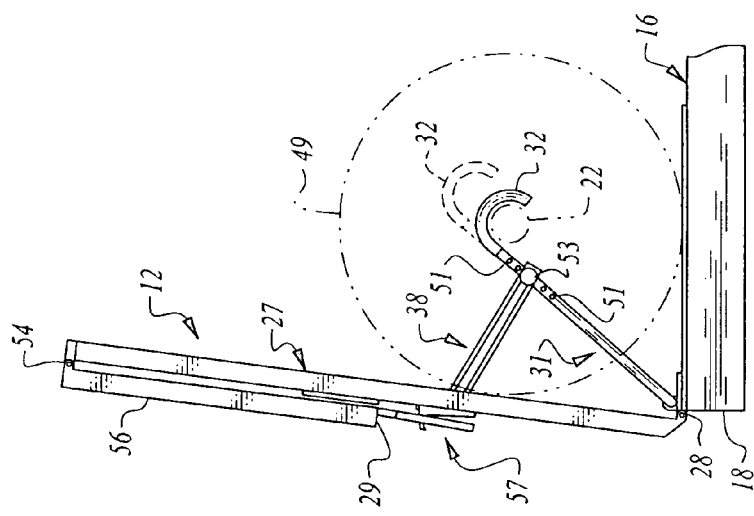
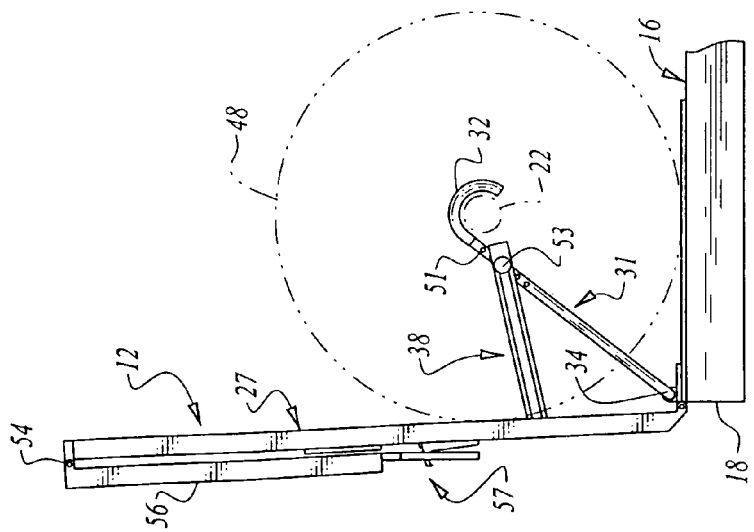

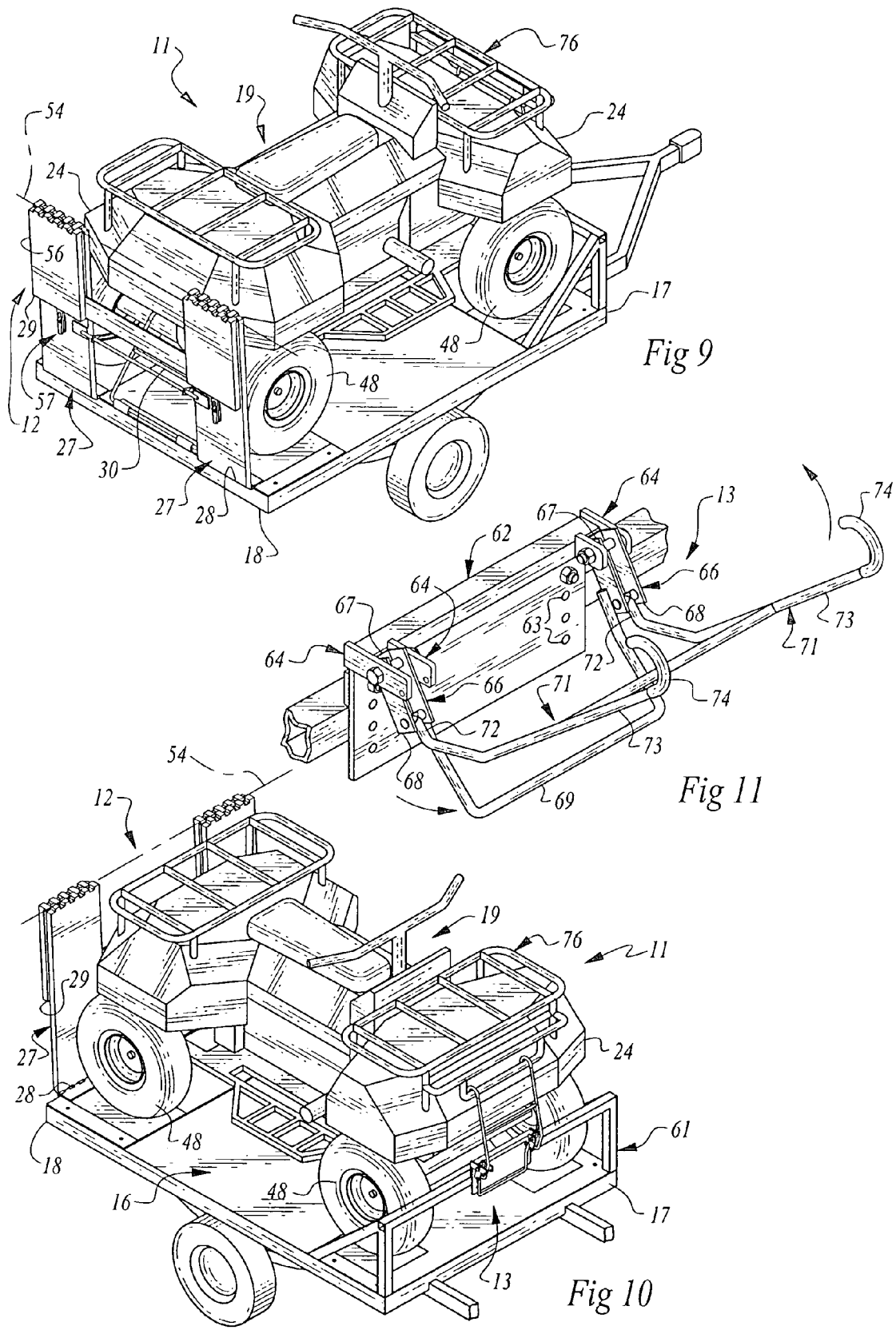

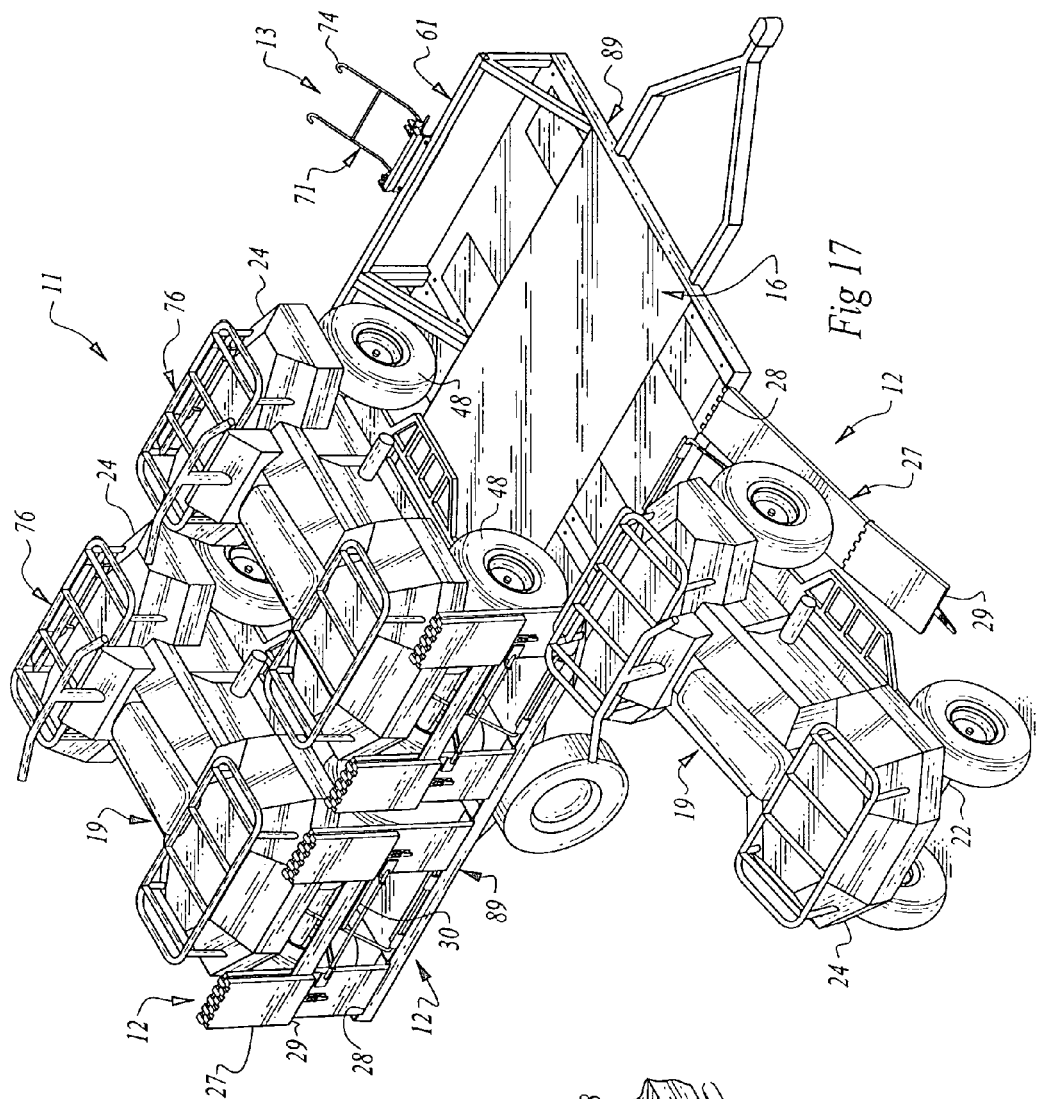
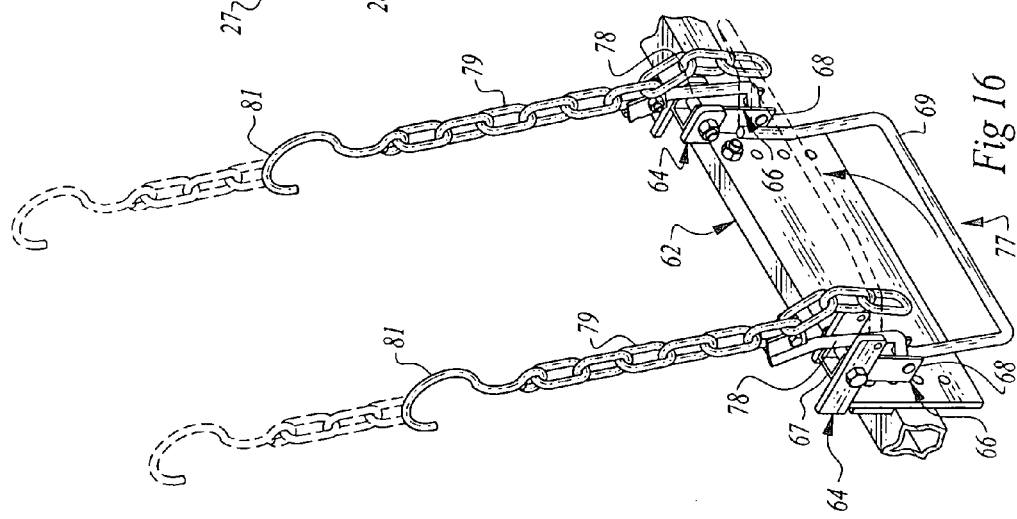

APPARATUS AND METHOD FOR SECURING A VEHICLE ON A CARRIER BED

BACKGROUND OF THE INVENTION

1. Field of the Invention

The invention relates generally to improvements in systems used in conjunction with the bed of a carrier, for loading, restraining, transporting, and unloading All Terrain Vehicles ("ATV"), snowmobiles, and the like. More specifically, the invention pertains to an apparatus for use on a trailer bed, a pickup truck bed, or the bed or hold of any motorized vehicle, comprising a rearwardly or laterally positioned combined axle restraint and ramp assembly, and a forwardly or laterally positioned vehicle hold down assembly, and a method for using same.

2. Description of the Prior Art

The most basic means for transporting an ATV or a like vehicle, is a flat bed trailer, towed behind a motor vehicle. To load the ATV, a pair of inclined ramps are arranged in spaced relation, extending from the ground level to the trailer bed. The ATV is then driven up the ramps and onto the bed, where the ATV parking brake is set. Cables, chains, or straps are used in conjunction with tie downs, to secure the frame, wheels, and/or the body of the ATV to the trailer bed. Typically, the individual ramps are then laid onto the trailer bed adjacent the ATV, so they will be ready at hand for the unloading process, after the destination has been reached.

Because ATVs are transported to remote locations for use, the roads encountered are often full of ruts, rocks, and curves. The trailer bed bounces and sways so much during transport that the cable, chain, rope and strap restraints holding the ATV can loosen or break, allowing the ATV to shift position, or even fall off the trailer. This may happen at any time, including the period after the tow vehicle and trailer are back on paved roads. Serious injury or death to innocent drivers or pedestrians can be caused by losing an ATV off the back or side of a trailer. At the very least, damage or destruction of the ATV would likely result from such an occurrence.

Exemplary of prior art efforts to provide a better means for securing ATVs, is U.S. Pat. No. 6,050,737, issued to Russell, for a Securing System For Transporting All-Terrain Vehicles. This arrangement uses adjustable-length connectors with rigid shafts in combination with tine pins, in lieu of chains, ropes, or cables. Tine pins are mounted on the front and rear portions of the ATV frame, and complementary tine pins are mounted on the front and rear ends of the floor of the transport trailer.

U.S. Pat. No. 5,749,685, granted to Hain, shows an Adjustable Securing Apparatus for ATVs, snowmobiles, or other vehicles. This construction relies upon a pivoted swing arm, having a ball socket on its end. This socket mates with a ball member, mounted on the underside of the vehicle.

An Apparatus For Securing A Small Recreational Vehicle is disclosed in U.S. Pat. No. 7,147,415, issued to Rorie et al. A mounting shaft, a receiver, and a securing ring are used in connection with an ATV secured on the bed of a trailer. In another embodiment, a similar arrangement is adapted for use in the bed of a pickup truck.

U.S. Pat. No. 5,553,882, issued to Unruh, shows a Snowmobile Securement System. A plate is bolted to a transport trailer, and includes a vertical post supporting an actuator on its upper end. The actuator is movable so that a contact member engages and encloses a connection member on the front ski of the snowmobile.

Another system for securing snowmobiles is disclosed in U.S. Pat. No. 5,816,757, granted to Huston, for a Utility Trailer Retaining Bar Hold Down Clamp. A pair of clamps secure a retaining bar in place. The retaining bar passes through the front skis of the snowmobile. For securing an ATV adjacent the snowmobile, triangular wheel chocks and a chain are used, in combination with the same retaining bar securing the snowmobile.

SUMMARY OF THE INVENTION

The present invention comprises an apparatus and a method for transporting an ATV, or like vehicle, on the bed of a carrier, such as a trailer or a motorized transport vehicle. In using the apparatus and in practicing the method disclosed herein, the ATV is loaded onto the bed using dedicated ramps, secured to the bed for transport to a desired location, and then unloaded from the bed using the same dedicated ramps upon arrival at a destination. The apparatus and method herein accomplish this process without the use of tie down straps, chains, or ropes that may loosen during transport causing the ATV to shift position, or even fall off the trailer. Yet another benefit of the present invention, is the incorporation and use of dedicated ramps as part of the ATV axle restraint assembly. This eliminates noise and possible damage resulting from loose ramps sliding around in the bed of the trailer during transport. Since the dedicated ramps are structurally integrated with the carrier bed and connected together to move in unison, the dedicated ramps also provide a very fast, efficient, and safe ramp system for loading and unloading the ATV.

To accomplish those purposes and others, a combined axle restraint and ramp assembly is provided at the rearward, or aft end of the carrier bed. The ramp assembly comprises a pair of ramps arranged in parallel, spaced relation, with a structurally integrating cross piece extending between them. One end of each ramp is pivotally connected to the rearward end of the carrier bed. In a lowered position, the other end of each ramp extends to the ground, providing an inclined ramp assembly so that the ATV can be driven directly onto the carrier bed. After the ATV is loaded and placed in neutral, the ramps are then rotated upwardly in unison, into a raised position. Now in a generally vertical orientation, the ramps rest upon the rear wheels of the ATV.

The axle restraint comprises a pair of rods provided with axle hooks on their distal ends. Each of the rods has a respective proximate end, pivotally attached to the rearward end of the carrier bed between the two ramps. The axle restraint also includes a pair of ramp links, each having an inner end and an outer end. The inner ends are pivotally connected to a respective ramp. The ramp links further include a slot, or other slidable connector means, located between the inner end and the outer end. A pin, passing through a distal end of a respective rod, engages each slot in slidable relation.

When the ramps are pivoted from a lowered position to a raised position, the ramp links and the rods connected thereto are automatically deployed, being lifted upwardly and forwardly by the movement of the ramps. The axle hooks are also pivoted upwardly and forwardly to assume an elevated position over the carrier bed and the rear axle of the ATV. Through manual manipulation of the ATV's fore and aft position, the axle hooks can be precisely located over the rear axle, and lowered into hooking engagement therewith.

A vehicle hold down assembly is provided at the forward end of the carrier bed. One purpose of the hold down assembly is to secure the ATV's rear axle tightly against the axle hooks of the axle restraint assembly, to prevent fore and aft shifting of the ATV. Another purpose of the hold down assembly is to compress the front end suspension of the ATV. By maintaining the suspension of the vehicle in a compressed state, vertical travel of the ATV's front suspension is minimized and dampened during transport.

To elevate and support the hold down assembly, a frame is mounted on the front end of the carrier bed. A pair of brackets, arranged in spaced relation, extend forwardly from an upper, central portion of the frame. A pair of crank arms are provided, each having an adjacent end pivotally mounted to a respective bracket. A U-shaped lever arm is included, having its ends attached to and extending outwardly from the remote end of each crank arm. The hold down assembly also includes a pair of hold down arms, each having a first end and a second end, and being interconnected with a transverse tie rod. The first end of each hold down arm is pivotally attached to the remote end of a respective crank arm. The second end of each hold down arm is provided with a hook.

When the lever arm is in an upper position, the hooks of the hold down arms are placed over frame, rack, or body parts of the front end of the ATV. When the lever arm is moved to a lower position, the ATV is pulled forwardly so that the rear axle is pulled snugly against the rear axle hooks. Concurrently, the downward movement of the hold down arms pulls the suspended frame and body of the ATV into a compressed position, limiting vertical excursions of the suspended parts of the ATV.

After the ATV has been transported to the desired location, the method of loading and securing the ATV is repeated in reverse order, so that the ATV can be unloaded onto the ground.

Another embodiment of the invention can carry a plurality of ATVs employing the same apparatus and method, except that the apparatus is mounted laterally with respect to the bed of the carrier. In addition vehicles are loaded and unloaded laterally, and secured transversely, with respect to the bed of the carrier.

BRIEF DESCRIPTION OF THE DRAWINGS

FIG. 1 is a perspective view, showing a trailer with its ramps in a lowered position and the ATV loaded onto the trailer bed;

FIG. 2 is a perspective view showing the front ends of the trailer and the ATV of FIG. 1;

FIG. 5 is a side elevational view of the axle restraint and ramp assembly, showing an axle hook engaged over the rear axle of an ATV;

FIG. 6 is a side elevational view as in FIG. 5, but showing the adjustment features of the axle restraint components adapted to engage the rear axle of an ATV with a smaller diameter rear tire;

FIG. 7 is a fragmentary perspective view of the axle restraint components, with the axle hook engaged over an ATV's rear axle;

FIG. 8 is fragmentary perspective view of a locking assembly for securing an articulated ramp extension section;

FIG. 9 is a perspective view of an ATV loaded and secured for transport, on a trailer;

FIG. 10 is a perspective view as in FIG. 9, but showing the front ends of the ATV and the trailer;

FIG. 11 is a perspective view of a vehicle hold down assembly being pivoted upwardly;

FIG. 16 is a perspective view of yet another embodiment of a vehicle hold down assembly using length-adjustable chain links provided with end hooks; and, FIG. 17 is a perspective view of an alternative embodiment, in which a larger carrier is fitted with the axle restraint and ramp assemblies and the vehicle hold down assemblies of the present invention, the carrier being adapted for lateral loading and unloading of three ATVs.

DETAILED DESCRIPTION OF THE PREFERRED EMBODIMENT

Figure 3:
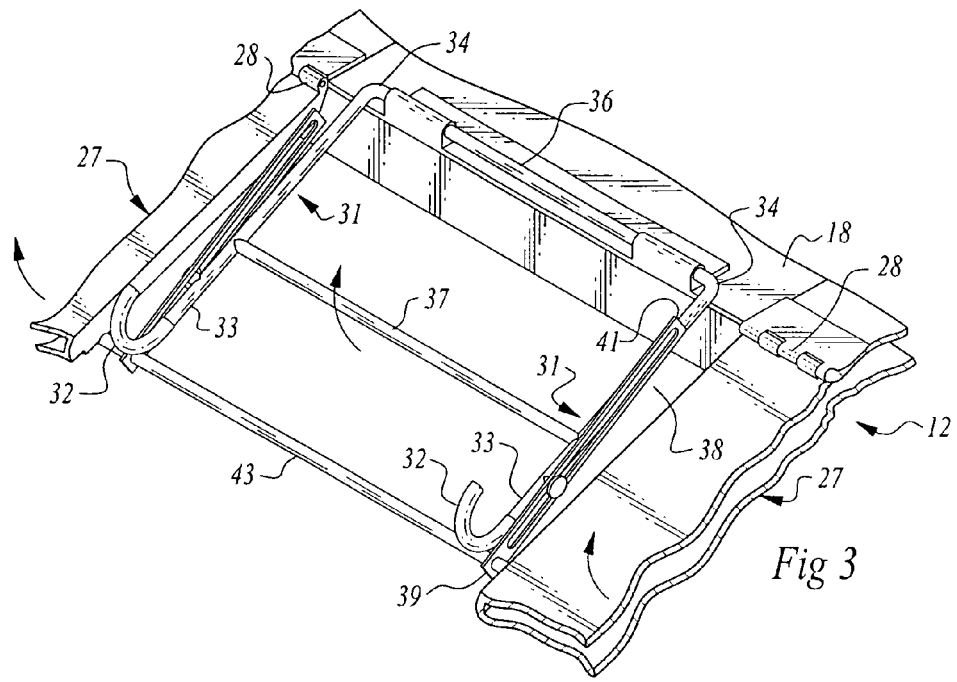
FIG. 3 is a fragmentary perspective view of the axle restraint and ramp assembly in a lowered position.

Turning now to FIG. 1, the apparatus 11 of the present invention comprises a combined axle restraint and ramp assembly 12 and a vehicle hold down assembly 13. The apparatus 11 is used in conjunction with a carrier 14 having a bed 16 with a forward end 17 and a rearward end 18. Carrier 14 is shown in the drawings in the form of a trailer to be towed behind a motorized transport vehicle. However, carrier 14 may also be included in the structure of the motorized transport vehicle itself, such as the bed of a pickup truck, the deck or the hold of a water craft, or the cargo bay of an aircraft. As will be explained more particularly herein, axle restraint and ramp assembly 12 is generally rearwardly positioned on bed 16, and vehicle hold down assembly 13 is generally forwardly positioned on bed 16.

The apparatus 11 is used to transport a vehicle 19 from one location to another. Vehicle 19 may be an All Terrain Vehicle ("ATV"), a snowmobile, or any other motorized vehicle having certain structural components and features. For example, vehicle 19 has a front axle 21 and a rear axle 22, a frame 23, and a body 24. A shock absorber and coil suspension system 26 is provided at each corner of the vehicle 19, extending from the front axle 21 and the rear axle 22 to the frame 23. Suspension system 26 thereby provides resilient suspension of the frame 23 and the body 24 attached to the frame.

The combined axle restraint and ramp assembly 12 comprises a pair of ramps 27 arranged in spaced relation to match the distance between the respective bottom centers of the front wheels and the rear wheels of the vehicle. Each of the ramps 27 has a respective upper end 28 pivotally connected to the rearward end 18 of the bed 16, and a respective lower end 29 extending to the ground when the ramps are in a lowered position, as shown in FIGS. 1 and 2. Ramps 27 further include a connector member 30, extending between them at a respective location between upper end 28 and lower end 29. Connector member 30 helps maintain ramps 27 in the proper spaced relation, and also enables the ramps to move in unison, when they are moved into different positions.

Assembly 12 also includes a pair of rods 31 provided with axle hooks 32 on their distal ends 33. Each of the rods 31 has a respective proximate end 34. Ends 34 are interconnected to each other and pivotally attached to the rearward end 18 of the bed 16 by means of a perpendicular common shaft 36. Rods 31 further include a cross brace 37 extending between them at a respective location between proximate end 34 and distal end 33. Shaft 36 and cross brace 37 both assist in maintaining the structural integrity of the connected rods, and also ensure that when moved from one position to another, the rods will move in unison.

Assembly 12 further includes a pair of ramp links 38, each link having an inner end 39 and an outer end 41 and an elongated body 42 therebetween. Inner end 39 of each link is pivotally connected to link shaft 43, which has its ends welded to plates 44. Vertical rows of threaded holes 46 in combination with bolts 47, provide a means for adjustable placement of the inner ends 39 of the ramp links along each ramp 27. For example, FIGS. 5 and 6 illustrate how vertical adjustment of the location of the pivotal attachment of inner ends 39 to the ramps assists in relocating the hook 32 to accommodate different locations for the axle 22, depending upon the relative size of the tire 48 and the tire 49. In addition, the position of hook 32 can also be adjusted in and out, longitudinally along the axis of rod 31, through the use of a plurality of transverse apertures 51.

Each of the ramp links 38 further includes connection means along its body 42 for slidingly engaging a distal end 33 of a respective one of the rods 31. For example, connection means may be provided by an elongated slot 52, located between the inner end and the outer end of link 38. Slot 52 is engaged by a transverse pin 53 extending through the slot and a selected aperture 51 in rod 31, to provide sliding engagement between the link 38 and the rod 31. Another obvious variation for the connection means would include a sleeve which is attached to rod 31 and which is sized and configured to slide over link 38.

Figure 4:
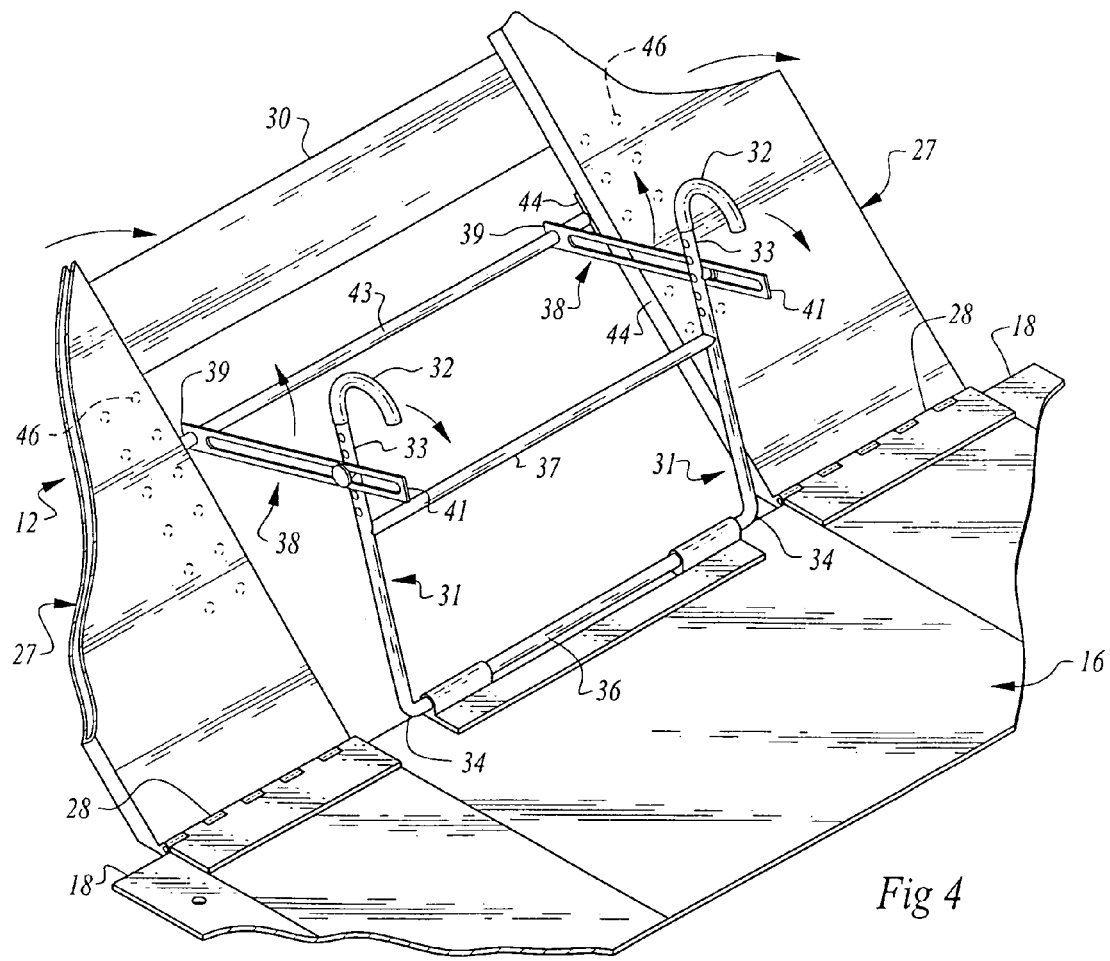
FIG. 4 is a fragmentary perspective view of the combined axle restraint and ramp assembly being pivoted upwardly, into a raised position.

With the ramps 27 in a lowered position, and respective lower ends 29 extending to the ground, vehicle 19 is driven onto the bed 16. The transmission of the vehicle is temporarily left in neutral and the emergency brake is left in a released position, in anticipation of the next step of the securement process. In this step, the rear axle 22 of the vehicle must be engaged by the axle restraint assembly 12. Upon raising the ramps 27 from a lowered position to a raised position, the ramp links 38 and the rods 31 connected thereto, are lifted upwardly. (Compare FIGS. 3 and 4). Concurrently, the axle hooks 32 are pivoted upwardly and forwardly to assume an elevated position over the bed 16 in preparation for engagement over the rear axle 22 of the vehicle 19.

The ramps 27 are raised sufficiently so that they are in a substantially vertical orientation, and in contingent relation with the rear tires 48 of the vehicle. As this position is assumed, the hooks 32 are raised up and over the axle 22, and then lowered into engagement therewith, as shown in FIG. 5. If there is any fore and aft adjustment of the vehicle necessary to make this engagement, it is readily made as the vehicle was previously left in neutral and with the emergency brake released.

FIG. 6 shows an accommodation which can be made, to adjust the axle restraint and ramp assembly for a smaller vehicle tire 49. First, the plates 44 holding the link shaft 43 are relocated into a higher position, effectively moving the hooks 32 rearwardly. Next, the hooks themselves may be relocated along distal ends 33, so that when lowered, hooks 32 engage axle 22 properly. In this way, vehicles having different sized tires may be accommodated without structural modifications to the apparatus 11.

It should also be noted that the ramps 27 are articulated about a transverse axis 54 adjacent lower end 29, providing a ramp extension section 56, useable when the ramps are in a lowered position. In a raised position, having the ramp extension sections 56 fold back upon the ramps 27 significantly lowers wind resistance, provides greater freedom from hitting low branches, and reduces the moment arm of the ramps when the carrier 14 is underway. For the purpose of securing the ramp extension sections 56 during vehicle transport, locking means 57 is provided, comprising a hasp 58 and a protruding bracket 59. A bolt or pin (not shown) may be placed through the end of bracket 59 to secure extension sections 56 in place.

A bed frame 61 is mounted on the forward end 17 of the bed, extending vertically above and transversely across said bed. The primary purpose of bed frame 61 is to support vehicle hold down assembly 13 at an elevated position on the central, forward end of the carrier bed. However, bed frame 61 also provides a forward safety restraint for the vehicle, during loading and during transport. For convenience of assembly and for flexibility in adjustment, vehicle hold down assembly 13 may be mounted on a base plate 62 which in turn is bolted to bed frame 61. As shown in FIG. 11, base plate 62 includes vertical rows of apertures 63, so that the vertical position of the base plate and the attached hold down assembly 13, relative to the bed 16, may be adjusted. It is evident that hold down assembly 13 could also be welded directly to frame 61.

Figure 12:
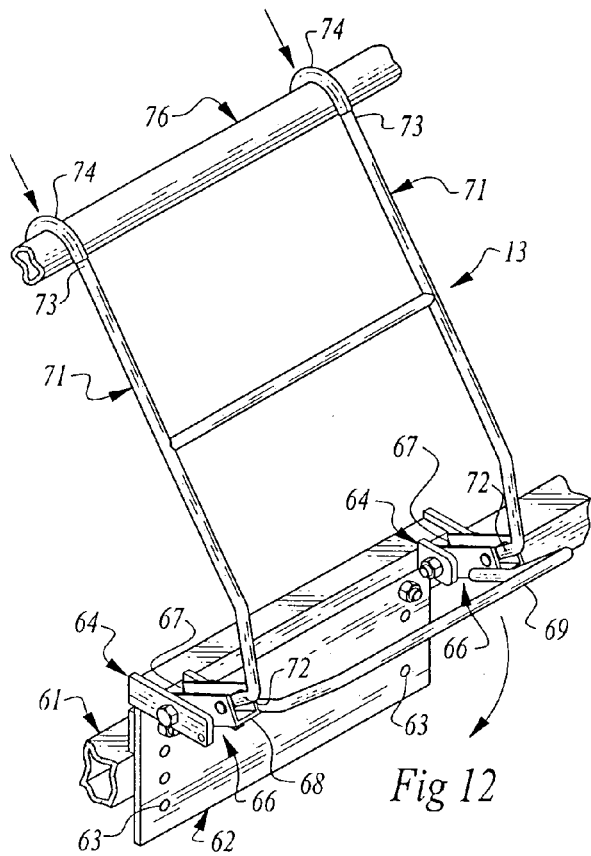
FIG. 12 is a perspective view of the vehicle hold down assembly with its rack hooks engaged over the ATV's equipment rack and the lever arm being rotated into a lowered position.
Figure 13:
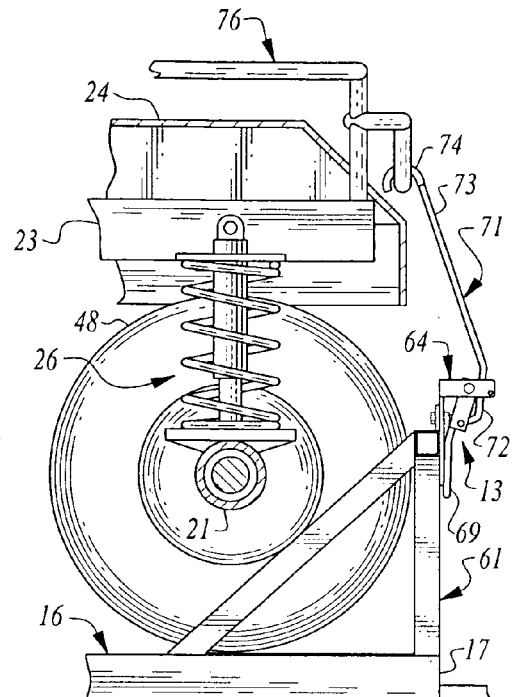
FIG. 13 is a side elevational view of the vehicle hold down assembly in a fully lowered position, compressing the suspension of the ATV.

Vehicle hold down assembly 13 comprises a pair of brackets 64, arranged in spaced relation, and extending forwardly from the central, upper portion of bed frame 61. A pair of crank arms 66 is provided, each having an adjacent end 67 and a remote end 68. Adjacent end 67 of each crank arm 66, is pivotally attached to a respective bracket 64. A U-shaped lever arm 69 is attached to and extending from the remote ends 68 of crank arms 66. A pair of hold down arms 71 are provided, each having a first end 72 and a second end 73. The first end 72 of each arm 71, is pivotally attached to the remote end 68 of a respective crank arm 66. The second end 73 of each arm 71 includes a hook 74, as shown most clearly in FIGS. 11, 12 and 13.

With the vehicle in its loaded position on the bed 16, as shown in FIG. 10, lever arm 69 is raised to an upper position, where hooks 74 are then lowered over an accessory rack 76. Accessory rack 76 is mounted on the body 24, which is mounted on suspended frame 23. It should be noted that the hooks 74 of the vehicle hold down assembly 13 can be secured directly to the body as well, or to forward extensions of the frame such as the vehicle bumper. It is required only that the hooks engage a forward part of the vehicle 19 which is resiliently suspended from the front axle and other running gear.

As the lever arm 69 is rotated downwardly, from an upper position to a lower position, the hooks 74 on the ends of the hold down arms 71 securely engage the accessory rack, and the applied forces pull the vehicle 19 slightly forwardly and downwardly. The forward movement secures rear axle 22 against hooks 32, effectively restraining any fore and aft movement of the vehicle. The downward movement of the suspended components of the vehicle, particularly in its forward end, compresses the shock absorbers and coil suspension system 26. By maintaining the suspension of the vehicle in a compressed state, vertical excursions of those suspended components are dampened and restrained, notwithstanding movement of the bed 16 during transport. A safety chain (not shown), may also be attached at this time, extending from the bed or the bed frame, to the frame 23 of the vehicle.

After the vehicle has been transported to the desired location, the above-recited method of loading and restraining the vehicle is reversed. Thus, the lever arm 69 of the vehicle hold down assembly 13 is pivoted upwardly, into a raised position, releasing the compressed suspension, and freeing the vehicle from any forward restraints. Then, the ramp extension sections 56 are released, and the ramps 27 swung rearwardly into a fully lowered position. Finally, the vehicle may be offloaded from the carrier 14.

Several different embodiments of components of the apparatus 11 have also been developed. A vehicle hold down assembly 77, shown in FIG. 16, represents a second embodiment of the vehicle hold down assembly 13, discussed above. This embodiment includes a pair of extension pieces 78, a pair of chains 79, and a pair of hooks 81. One end of each extension piece 78 is pivotally connected to remote end 68, of a respective crank arm 66. The other end of each extension piece is bolted to a respective chain 79. The particular point of connection to the chain provides a degree of adjustment for the assembly, to accommodate different points of attachment for differently sized and configured vehicles. The hook 81 is attached to the end of the chain remote from the extension piece. In all other respects of structure, operation, and function, this vehicle hold down assembly is identical to that of previously described hold down assembly 13, so those previously discussed points will not be repeated.

Figure 14:
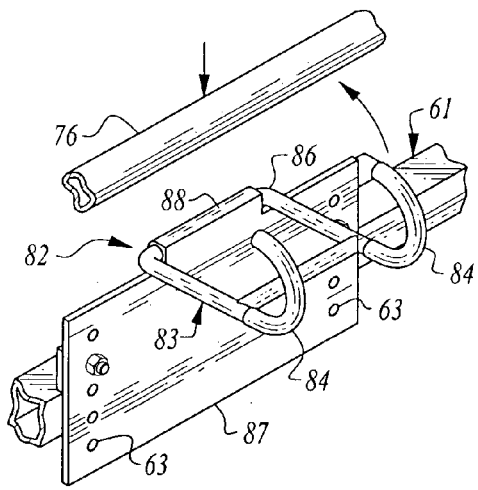
FIG. 14 is a perspective view of another embodiment of a vehicle hold down assembly being rotated upwardly for engagement with an equipment rack.
Figure 15:
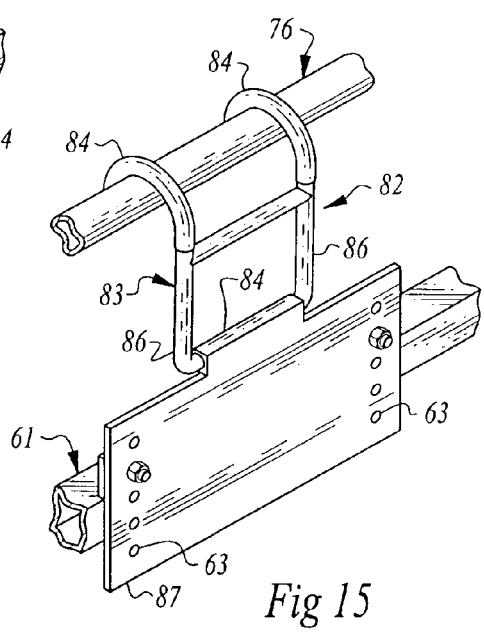
FIG. 15 is a perspective view as in FIG. 14, but with the vehicle hold down assembly in engagement with the ATV's equipment rack.

A vehicle hold down assembly 82, shown in FIGS. 14 and 15, represents a third embodiment of the vehicle hold down assembly component of apparatus 11. This embodiment includes a hook assembly 83, including hooks 84 and a rectangular-shaped connector 86. Hooks 84 are mounted in spaced relation to one end of connector 86. Assembly 82 may be mounted to a base plate 87, having the same adjustability feature for attachment to bed frame 61 as described previously. An elongated boss 88, provided with a bore, extends from the upper end of base plate 87. Boss 88 could also extend directly from frame 61. The other end of connector 86 loosely engages the bore in boss 88, allowing the hook assembly to pivot from a lowered position (FIG. 14) to a raised position (FIG. 15).

The principal difference in use of assembly 82, is that the front suspension components of the vehicle 19 must manually be compressed by the user, before the hook assembly 83 can be raised to engage the accessory rack 76, or another appropriate part of the vehicle. This manual compression may be carried out by standing upon the front bumper, or by utilizing a pry tool working between the frame 61 and the bumper or frame of the vehicle.

The apparatus 11 of the present invention may also be used in an alternative embodiment, to secure multiple vehicles to a single carrier. For example, in FIG. 17, a carrier 89 having a greater length and a greater transverse dimension than that of carrier 14 may be employed to advantage. In this arrangement, the axle restraint and ramp assembly 12 and the vehicle hold down assembly 13 for each of the vehicles, are mounted laterally, on opposing sides of the carrier 89. This allows lateral loading and unloading of the vehicles, instead of end loading and unloading as is used for carrier 14. In addition, the use and operation of the carrier 89 contemplates an adjustment of the transverse position of each vehicle on the carrier bed, rather than the fore and aft adjustment procedure described above. However, in all other respects, the structure and operation of the axle restraint and ramp assembly 12 and the vehicle hold down assembly 13 in this alternative embodiment, are identical to that already set forth in the description of the single vehicle carrier 14.

What is claimed is:

1. An apparatus for transporting a vehicle having a frame and a body and a resilient suspension between the frame and a front axle, comprising:
    a. a carrier having a bed, said bed having a forward end and a rearward end;
    b. a vehicle axle restraint and ramp assembly comprising: a pair of ramps arranged in spaced relation, each of said ramps having a respective upper end pivotally connected to said rearward end of said bed and a respective lower end extending to the ground when said ramps are in a lowered position; a pair of rods, each of said rods having a proximate end and a distal end and being provided with axle hooks on said distal ends, each of said rods having a respective said proximate end pivotally attached to said rearward end of said bed; a pair of ramp links, each of said ramp links having an inner end and an outer end and an elongated body therebetween, said inner end being pivotally connected to a respective one of said pair of ramps, each of said ramp links further including a connector for slidingly engaging a distal end of a respective one of said rods along said elongated body, whereby upon raising said ramps from a lowered position to a raised position, said ramp links and said rods connected therewith, are lifted upwardly, and said axle hooks are pivoted upwardly and forwardly at an elevated position over said bed for engagement over a rear axle of the vehicle on said bed; and,
    c. vehicle hold down means on said forward end of said bed, for securing the rear axle of the vehicle tightly against said axle hooks of said axle restraint assembly, and for maintaining the suspension of the vehicle in a compressed state.

2. An apparatus as in claim 1, further including a connector member extending between said pair of ramps at a respective location between said upper end and said lower end.

3. An apparatus as in claim 1, further including a cross brace extending between said pair of rods at a respective location between said proximate end and said distal end.

4. An apparatus as in claim 1 in which a point of pivotal attachment of said inner end of each of said ramp links to a respective one of said pair of ramps is adjustable along a respective ramp.

5. An apparatus as in claim 1 in which each of said ramps is articulated about a transverse axis adjacent said lower end, providing a ramp extension section, when said ramps are in said lowered position.

6. An apparatus as in claim 1 in which said connection means includes a slot located between said inner end and said outer end, and a pin engaging said slot in slidable relation therewith.

7. An apparatus as in claim 1 in which said proximate ends of said rods are interconnected by a perpendicular common shaft, said shaft being pivotally attached to said rearward end of said trailer bed.

8. An apparatus as in claim 1 in which downward forces applied to the resilient suspension of the vehicle place the resilient suspension in the compressed state and further including a bed frame mounted on said forward end of said bed, said bed frame extending vertically above and transversely across said bed, and in which said vehicle hold down means comprises: a bracket extending forwardly from an upper portion of said bed frame; a crank arm having an adjacent end and a remote end, said adjacent end being pivotally attached to said bracket; a lever arm attached to and extending from said crank arm; a hold down arm having a first end and a second end, said first end being pivotally attached to said remote end of said crank arm, and said second end including a hook, whereby, moving said lever arm from an upper position to a lower position, said hold down arm engages the frame or body of the vehicle on said bed, pulls the vehicle forwardly and places the resilient suspension in the compressed state.

9. An apparatus as in claim 1 in which downward forces applied to the resilient suspension of the vehicle place the resilient suspension in the compressed state and further including a bed frame mounted on said forward end of said bed, said bed frame extending vertically above and transversely across said bed, and in which said vehicle hold down means comprises: a bracket extending forwardly from an upper portion of said bed frame; a crank arm having an adjacent end and a remote end, said adjacent end being pivotally attached to said bracket; a lever arm attached to and extending from said crank arm; a chain having a first end and a second end, said first end being attached to said remote end of said crank arm, and said second end including a hook, whereby, moving said lever arm from an upper position to a lower position, said hook engages the frame or body of the vehicle on said bed, pulls the vehicle forwardly and places the resilient suspension in the compressed state.

10. An apparatus as in claim 1 in which downward forces applied to the resilient suspension of the vehicle place the resilient suspension in the compressed state and further including a bed frame mounted on said forward end of said bed, said bed frame extending vertically above and transversely across said bed, and in which said vehicle hold down means comprises: a hold down arm having a first end and a second end, said first end being pivotally attached to an upper end of said bed frame, and said second end including a pair of hooks, whereby, pulling the vehicle forwardly and compressing the resilient suspension allows said hooks to be pivoted upwardly to engage the frame or body of the vehicle and place the resilient suspension in the compressed state.

11. An apparatus for transporting a vehicle having a frame and a body and a resilient suspension between the frame and a front axle, comprising:
   a. a carrier having a bed, said bed having a forward end and a rearward end;
   b. combined vehicle axle restraint and ramp means, said means being attached to said rearward end of said bed, said means further having a lowered position providing an inclined driving surface for the vehicle to be driven onto and off of said bed, and a raised position for restraining a rear axle of the vehicle during transport from forward movement;
   c. a frame mounted on said forward end of said bed, said frame extending vertically above and transversely across said bed;
   d. a vehicle hold down assembly comprising: a bracket extending forwardly from an upper portion of said frame; a crank arm having an adjacent end and a remote end, said adjacent end being pivotally attached to said bracket; a lever arm attached to and extending from said crank arm; a hold down arm having a first end and a second end, said first end being pivotally attached to said remote end of said crank arm, and said second end including a hook, whereby, moving said lever arm from an upper position to a lower position, said hold down arm engages the frame or body of the vehicle on said bed, pulls the vehicle forwardly and maintains the resilient suspension in a compressed state.

12. An apparatus as in claim 11 further including a pair of said brackets, a pair of said crank arms, and a pair of said hold down arms, said lever arm being attached to and extending from said pair of crank arms.

13. An apparatus as in claim 11 in which said combined vehicle axle restraint and ramp means comprises: a pair of ramps arranged in spaced relation, each of said ramps having a respective upper end pivotally connected to said rearward end of said bed and a respective lower end extending to the ground when said ramps are in a lowered position; a pair of rods, each of said rods having a proximate end and a distal end and being provided with axle hooks on their distal ends, each of said rods having a respective proximate end pivotally attached to said rearward end of said bed; a pair of ramp links, each of said ramp links having an inner end and an outer end and an elongated body therebetween, said inner end being pivotally connected to a respective ramp, each of said ramp links further including a connector for slidingly engaging a distal end of a respective one of said rods along said elongated body, whereby upon raising said ramps from said lowered position to a raised position, said ramp links and said rods connected therewith, are lifted upwardly, and said axle hooks are pivoted upwardly and forwardly at an elevated position over said bed for engagement over a rear axle of the vehicle on said bed.

14. An apparatus as in claim 13, further including a connector member extending between said pair of ramps at a respective location between said upper end and said lower end.

15. An apparatus as in claim 13, further including a cross brace extending between said pair of rods at a respective location between said proximate end and said distal end.

16. An apparatus as in claim 13 in which a point of pivotal attachment of said inner end of each of said ramp links to a respective one of said pair of ramps is adjustable along said ramp.

17. An apparatus as in claim 13 in which each of said ramps is articulated about a transverse axis adjacent said lower end, providing a ramp extension section, when said ramps are in said lowered position.

18. An apparatus as in claim 13 in which said connection means includes a slot located between said inner end and said outer end, and a pin engaging said slot in slidable relation therewith.

19. A method for securing a vehicle having a rear axle, a front axle, a frame, a body, and a resilient suspension between the frame and the front axle, to the bed of a carrier comprising the steps of:
   a. providing a combined axle restraint and ramp assembly at the rearward end of the carrier bed;
   b. placing the axle restraint of said combined axle restraint and ramp assembly over the rear axle;
   c. providing a vehicle hold down assembly at the forward end of the carrier bed;
   d. connecting said vehicle hold down assembly to the frame or body of the vehicle; and,
   e. pulling the frame and body forwardly and downwardly with said vehicle hold down assembly, securing the rear axle against the axle restraint, and maintaining the vehicle's suspension in a compressed state.

20. A method as in claim 19 further including the steps of: lowering the ramp assembly of said combined axle restraint and ramp assembly; providing an inclined ramp for loading the vehicle on the bed; raising said ramp assembly; placing said ramp assembly in a substantially vertical position and concurrently moving said axle restraint upwardly and forwardly at an elevated position over the bed for engagement over the rear axle of the vehicle.

* * * * *